UNITED STATES PATENT OFFICE.

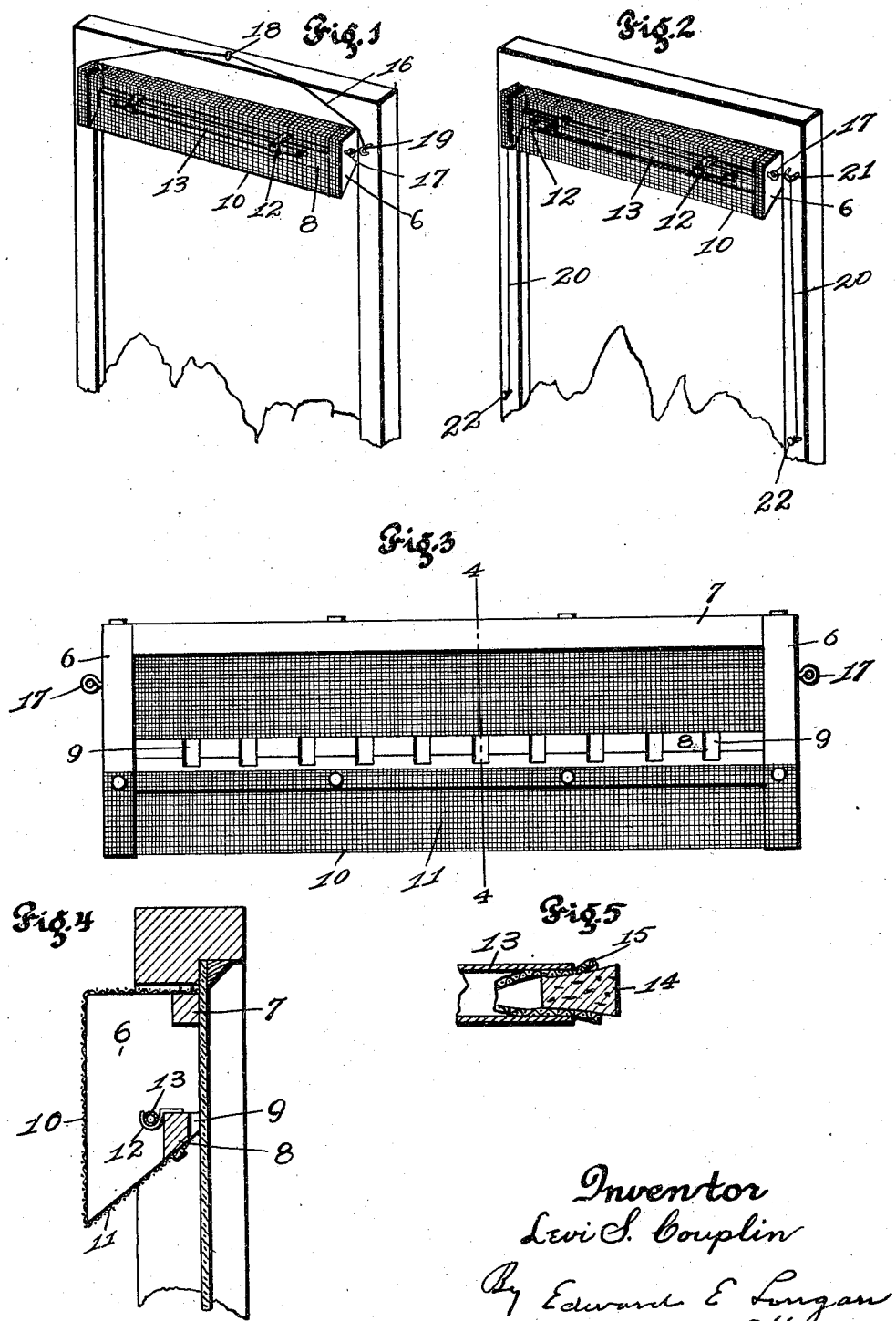

LEVI S. COUPLIN, OF SOUTH GREENFIELD, MISSOURI.

FLY-TRAP.

1,290,717.  Specification of Letters Patent.  Patented Jan. 7, 1919.

Application filed March 30, 1917. Serial No. 158,673.

*To all whom it may concern:*

Be it known that I, LEVI S. COUPLIN, a citizen of the United States, and resident of South Greenfield, in the county of Dade and State of Missouri, have invented certain new and useful Improvements in Fly-Traps, of which the following is a specification containing a full, clear, and exact description, references being had to the accompanying drawing, forming a part hereof.

My invention relates to improvements in "fly traps" formed of reticulate material and arranged to be secured to a window or screen which window or screen when the trap is in position for use forms one wall of the trap, the flies being permitted to enter the trap through recesses or openings formed in the frame work of the trap.

My invention has for its object the provision of a trap which is light and inexpensive in construction, neat in appearance and may be easily and quickly installed and which may be easily "baited" and is highly efficient for its intended purpose.

My improvements consist of the novel construction, arrangement and combination of parts as hereinafter fully, clearly and concisely set forth in my specification, pointed out in my claim and illustrated by the accompanying drawings, in which—

Figure 1 is a perspective view of my improved trap when applied to a window or glazed opening.

Fig. 2 is a similar view illustrating a different manner of installing the trap and especially showing the method of installation when the trap is applied to a glazed opening, which is not readily accessible on account of its height—provision being made in this form of installation to adjust the trap up and down.

Fig. 3 is a rear plan view of the trap.

Fig. 4 is a transverse section taken on the line 4—4 of Fig. 3, and

Fig. 5 is a fragmental sectional view of the container for the fly poison or bait.

Referring to the drawings, 6 indicates the end framing members of the trap which has its front and rear edges parallel the top edge at a right angle to the front and rear edge and the lower edge cut at an incline. The two end pieces 6 are connected together by members 7 and 8 suitably secured to the end members 6. The member 8 is provided with a series of vertical and parallel openings or slots 9, arranged at regular distances apart throughout said member and constitute when the trap is in use, passage ways for flies to the interior of the trap.

Secured around the top, front and inclined edges of the member 6 is a body of wire screening or reticulated material 10. Said material is also secured to the top face of the member 8 and to the lower face of the member 9, the edge of the wire cloth or screening being positioned in line with the bottoms of the notches 9. The screening is secured to the member 8 in such a manner as to not obstruct or cover up the notches 9.

It will be observed that the screening does not extend all the way around the trap; that is to say, the rear side of the trap is left unscreened and has what might be termed a normally open side, which is closed when the trap is in use by the window or screen against which it is placed.

The peculiar shape of the trap, as will be observed by reference to Fig. 4, provides an overhanging screened ledge 11, which forms a guide way between the glazed opening and said ledge for the flies. Secured to the member 8 are hooks 12 suitably spaced apart which is adapted to support a cylindrical metallic container 13,—said container 13 has both of its ends open which are closed by corks 14 and an absorbent tubular wick 15. This container is adapted to contain the fly poison or bait which is poured into the container in liquid form by removing one of the corks 14 and then the bait or poison is gradually absorbed by the tubular wick 15, and is absorbed in that portion of the wick which extends beyond the tube where it is accessible for the flies.

By this provision, the bait or poison is gradually absorbed and made accessible to the flies. The tube may be inserted or removed through the open side of the trap between the members 7 and 8. It will be observed that the tube containing the fly poison or bait is located on the inside of the trap and about in line with the notches 9, through which the flies find access to the interior of the trap.

In Fig. 1 I have shown the trap installed to a low window, the method of installation in this instance being made by affixing a cord 16 to the ends of the trap by means of screw eyes 17.

By the employment of a hook or pin 18 on the top of the glazed or screened opening and downward turned hooks 19, the trap may be installed as illustrated in Fig. 1. Should it be desired to install the trap to a high glazed opening a cord 20 is secured to each end of the trap and passed over hooks 21 and having there free ends secured or wound around buttons 22. By this method of installation, the trap may be raised or lowered on a screened or glazed opening.

As previously stated, the trap has a normally open side which is inclosed when it is in use, by means of the glazed or screened opening against which it is placed. The normally open side of the trap not only makes it economical in construction, but affords a sufficiently wide opening for the discharge of the dead flies and the cleaning of the trap, as well as the introduction or removal of the tube 13.

Having thus fully described my invention, what I claim is:—

A fly trap comprising imperforate end members, whose bottom edges are arranged at an angle to their top edges, an upper longitudinal member rectangular in cross section, connecting the end members at their upper portions, a lower longitudinal member spaced apart from the upper longitudinal member and connecting the end members at their lower portions, said lower member having its lower face arranged at an angle to its upper face and provided on its outer vertical face with a series of notches, a sheet of screening attached to the upper and lower longitudinal members and surrounding three sides of the end members, thereby leaving the remaining side open, and adapted to be closed by the window pane against which the trap is swung when in use, a pair of brackets affixed to the lower longitudinal member adjacent the open side of the trap, and extending into the interior thereof, and a removable fly poison container located within the trap adjacent to the open side thereof.

In testimony whereof, I have signed my name to this specification, in presence of two subscribing witnesses.

LEVI S. COUPLIN.

Witnesses:
M. P. CARPENTER,
M. E. KLEE.